Jan. 7, 1941.   J. H. ROETHEL   2,227,761
FASTENING DEVICE
Filed July 19, 1937
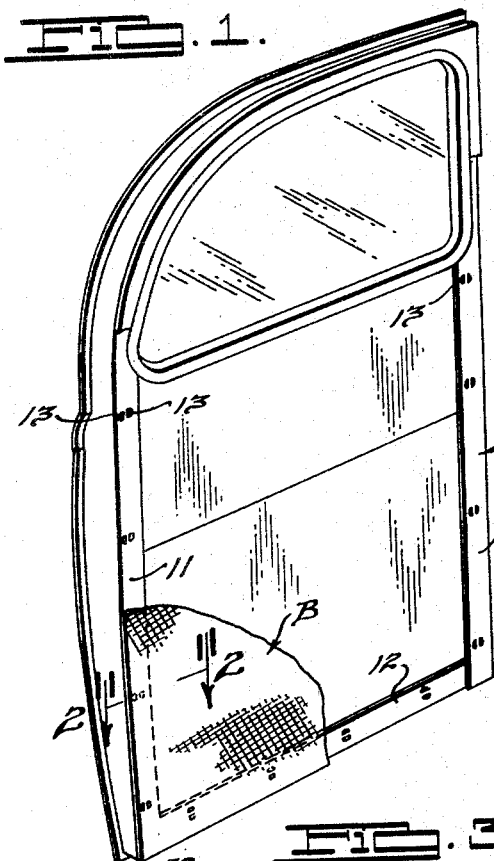
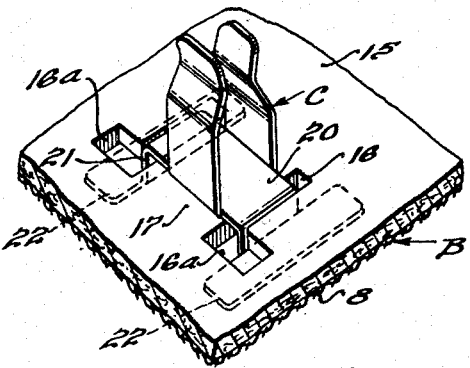
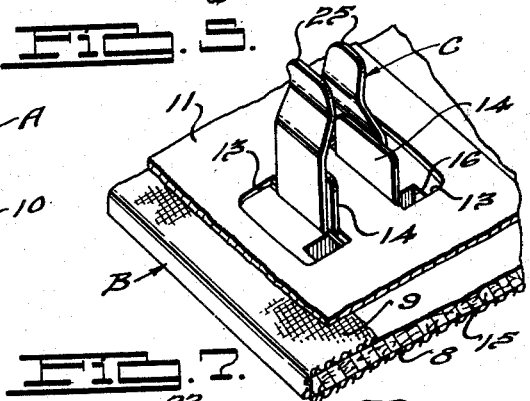
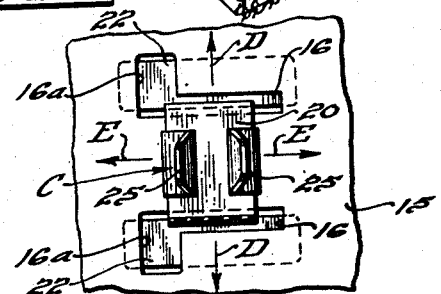
INVENTOR
John H. Roethel.
BY Dike, Calver & Gray
ATTORNEYS.

Patented Jan. 7, 1941

2,227,761

UNITED STATES PATENT OFFICE 2,227,761

FASTENING DEVICE

John H. Roethel, Detroit, Mich., assignor to Marvel Equipment Corporation, Detroit, Mich., a corporation of Michigan Application July 19, 1937, Serial No. 154,436

5 Claims. (Cl. 24—73)

This invention relates to fastening means for releasably connecting two members together face to face, such for example as a trim or finished panel and a support, and to the method and means of applying a fastener element to one of the members. The fastening means embodying the invention are capable of use in various relations, such as in connection with the application of finish trim to the interior of motor vehicle bodies, or for any use where a surface is to be covered by upholstery material or other fabric to conceal or cover the supporting medium or surface.

One of the objects of the invention is to provide an improved fastening means in which the elements thereof are preferably although not necessarily capable of being stamped or punched from sheet metal at relatively low cost, the construction being relatively simple and inexpensive and the cooperating elements being so constructed as to permit ease and efficiency in the assembly of parts and attachment of the members face to face.

Another object of the invention is to provide improved fastening means of the above character in which adjustments of the elements of the fastening means and of the members carrying such fastening means may be readily effected whereby the elements of the fastening means will readily and efficiently cooperate and interfit regardless of variations in the location of parts due to manufacturing tolerances or inaccuracies.

Another object of the invention is to provide the foundation sheet or other member, carrying one of the fastener elements, with pre-formed slots or openings capable of receiving and supporting the fastener element to permit adjustment of the element laterally in one direction in the plane of the member.

The above and other objects of the invention will appear from the following description and appended claims when considered in connection with the accompanying drawing forming a part of this specification, wherein like reference characters designate corresponding parts throughout the several views.
In the drawing:

Fig. 1 is a perspective view of the interior of a motor vehicle door, showing a trim panel and fastener elements embodying the present invention, the panel being broken away to reveal the supporting surface for the panel.

Fig. 2 is a fragmentary horizontal section taken substantially along the line 2—2 of Fig. 1, looking in the direction of the arrows.

Fig. 3 is a perspective view, on an enlarged scale, showing one embodiment of fastener element per se of the present invention.

Fig. 4 is a fragmentary perspective view showing a trim panel or foundation piece and illustrating one method of applying a fastener element thereto.

Fig. 5 is a fragmentary perspective view, on an enlarged scale, showing a fastener element applied to a trim panel or backing sheet and illustrating the differential or variation in the sheet opening and element.

Fig. 6 is a fragmentary bottom plan view, on an enlarged scale, of a fastener element applied to its foundation sheet or panel and illustrating the adjustability of the element relative to and over the inner face of the panel.

Fig. 7 is a fragmentary perspective view, on an enlarged scale, showing a fastener device and panel in operative position upon a supporting surface or member and illustrating an extreme position of adjustment in one direction of the panel and fastener upon the support; and Fig. 8 is a fragmentary horizontal section, on an enlarged scale, taken through the panel, fastener and support and showing a modified form of fastener device embodying the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

As will be understood, the fastening means comprises cooperating elements carried by two members adapted to be releasably connected together face to face. Various kinds of members may be used and in the drawing these members, by way of example, are exemplified by a trim panel and a support of a vehicle body.

In the drawing, A represents a motor vehicle door having, merely by way of example, upright inturned flanges 10 and 11 and a bottom or horizontal inturned flange 12. As shown, each of the flanges 10, 11 and 12 is provided with a series of aperture means, each of which may comprise a pair of openings 13, see particularly Figs. 1 and 2. The openings 13, as shown, are formed by striking up the metal of the flange to provide a pair of inwardly projecting spaced tongues or lugs 14 which are adapted to be engaged or gripped by the legs or prongs of a fastener element of the present invention.

The inner face of the door A is adapted to be covered by a trim panel B which, as shown, comprises a foundation sheet or backing 15 and trim fabric 8. The trim fabric is turned over the marginal edges of the panel as shown at 9 and secured to the inner face thereof in any suitable manner, as by gluing the overlapping edges of the panel. At predetermined spaced points corresponding approximately to the aperture means 13 formed in the supporting flanges of the door, the foundation sheet 15 is cut out to provide a pair of substantially L-shaped openings or slots 16 which are spaced apart and which have their leg portions of greatest length in substantial parallelism. The slots 16 are separated or spaced apart by an intervening strip or tongue 17 formed from the material of the panel. As will be explained hereinafter, the L-shaped openings or slots 16 are of greater length than the width of the base portion of the fastener element and the bridge piece or tongue 17 is likewise of greater length than the width of said base portion and also narrower than the length of the said base so as to permit adjustment in four directions of the fastener element relative to the panel to compensate for any variations in the location of the support aperture means.

Referring particularly to Fig. 3, the fastener element C of the present embodiment of the invention comprises a base portion 20 which, as shown, is oblong. The base or body portion 20 of the fastener at its end edges is turned downwardly to provide a pair of spaced abutments 21 and then turned outwardly to provide a pair of tongues or feet 22 which, as shown, extend at substantial right angles to the bridge piece or body portion 20 and lie in planes below and spaced from said body portion 20. The fastener is provided with a pair of spaced upwardly extending spring prongs or legs 23 which are formed from the metal of the base and are turned upwardly at substantial right angles thereto. The spring prongs converge inwardly at 24 and then flare outwardly at 25 at their free ends or lead portions. Preferably the fastener element is stamped from sheet metal by a single operation and is case hardened so that the portions thereof will be relatively stiff. The purpose of the converging portions of the fastener legs or gripping members is to cause said legs to grip the inturned lugs or portions 14 of the support at points removed from the base of the support as best seen in Fig. 2. The outwardly flared ends or lead portions 25 of the fastener permit its engagement with the spaced lugs 14 of the support and due to their relative stiffness they will embrace or straddle the lugs and grip them at their free ends to hold the fastener in intimate gripping engagement with said lugs.

The fastener element C is adapted to be applied to the foundation sheet or base 15 and snapped into place by inserting either of the ends of the feet 22 of the fastener into the short legs 16a of the spaced L-shaped slots. The fastener is then pushed through the slots 16a, 16 until the fastener has reached its position of Figs. 2, 5 and 6 with the feet portions 22 thereof underlying the under or outer face of the foundation sheet 15. With the fastener in this position upon the panel it will be seen that the base or body portion 20 thereof loosely straddles the tongue or partition 17 formed in the foundation sheet and that the opposite ends of the fastener feet 22 underlap the ends of the slots 16 or 16a, dependent upon the position of the fastener in the slots. By reason of the fact that the base portion 20 has a length which is greater than the width of the tongue 17 longitudinal or lengthwise adjustment of the fastener relative to its supporting panel is permitted. This is illustrated by the arrows D appearing in Fig. 6. By reason of the fact that the slots 16 and 16a, as well as the tongue or partition 17, are longer than the transverse dimension or width of the fastener base or bridge piece 20, the fastener is permitted to slide laterally lengthwise in the slots as illustrated by the arrows E in Fig. 6. Therefore, a four-way adjustment or variation of the fastener relative to its supporting surface or member is permitted, thus allowing the panel and/or the fastener element to be shifted upon application to the supporting member A to accommodate for any variation in the location of the openings 13 and supporting lugs 14 formed in the flanges of the support.

The depending abutments 21 of the fastener are of only slightly greater depth or height than the thickness of the panel board 15 so that when the fastener is applied to the board the feet 22 thereof will frictionally engage the outer or bottom face of the foundation sheet or board 15 and will thus lie substantially flush with said face and thereby eliminate any hump or projection under the trim fabric 8.

By reference to Fig. 5 the differential in the longitudinal and transverse dimensions of the base or body 20 of the fastener, the bridge piece or portion 17 of the foundation sheet and the slots or openings 16, 16a thereof will be apparent. This differential in the dimensions permits longitudinal and transverse adjustment in two directions at substantial right angles to one another of the fastener relative to the foundation sheet.

As best seen in Fig. 7 the slots or openings 13 formed in the support A are somewhat longer than the width of the fastener legs or gripping portions so as to provide for an additional adjustment of the fastener prongs relative to the cooperating tongues or lugs 14 along the width of the tongues. This is clearly illustrated by the position of the legs 23—25 of the fastener with respect to the slots 13 and the inturned lugs 14. By reason of the fact that the lugs 14 are of somewhat greater width than the width of the fastener legs 23—25, the legs will straddle and grip said lugs firmly regardless of the relative lateral positions of the fastener and lugs.

It is to be noted that the converging portions 24 of the prongs or legs of the fastener device are relatively remote from the point of support of the fastener and that the outer ends of the tongues or lugs 14 engage these converging portions to resiliently separate the prongs which straddle them, whereby the gripping action of the prongs upon the tongues takes place not at the point of entry of the prongs through the apertures 13, or at the edges of the apertures, but rearwardly thereof at a remote point. Hence the members are firmly clamped against relative free, loose or cocking movement. The connection between said members is, therefore, firm, not sloppy.

Such construction and arrangement of parts likewise permits the fastener and its trim panel to be removed from the supporting surface of the door with considerably less effort than if the legs of the fastener engaged and gripped the base portions of the lugs 14. Thus the panel can be removed by the insertion of a tool, such as a screw driver, at points between the panel and its supporting member.

Referring particularly to Fig. 8 of the drawing, I have shown a somewhat modified form of fastening means F for attaching two members together, such as a trim panel to a vehicle body frame member. In this form of the invention the supporting member is shown as a metal panel 50 formed at a predetermined point or at predetermined points with aperture means in the form of a single opening 51 defined on opposite sides by spaced lugs or tongues 52 which are struck from the metal of the support and which project outwardly from the support. The fastener element of the present embodiment is secured, for example, to a trim panel BB in the same manner as is the fastener C above referred to.

The fastener element of the means F has a base or bridge portion 53 which is turned downwardly at its end edges to provide a pair of spaced abutments 54 and then turned outwardly to provide a pair of tongues or feet 55, one thereof being shown in Fig. 8. The feet 55 extend transversely at substantial right angles to the bridge piece 53 and lie in planes below and, as shown, spaced from the bridge piece. The fastener is provided with a pair of spaced outwardly extending spring prongs or fingers 56 which are formed from the metal of the base or bridge portion and which converge inwardly and then diverge outwardly at 57 to contact with the outer free ends of the lugs or tongues 52 at points removed from the base of the tongues. The prongs are then turned inwardly in converging relation to provide lead portions 58. Thus the fastener has formed in its prongs opposed projections or bulges 59. The fastener is adapted to enter and pass through the opening or aperture 51 after introducing the lead ends 58 thereof into the opening and forcing the parts together. As the fastener is forced inwardly toward operative position, the prongs thereof are compressed or sprung toward each other until the members are brought face to face. After the humps or bulged portions 59 of the prongs have passed beyond the free ends of the lugs or tongues 52, the prongs spring or spread outwardly so that the inclined portions thereof frictionally and resiliently engage the free ends of the tongues to clamp the parts together. The fastener is applied to and mounted in the panel BB, for example, in the same manner as the fastener C, and has a wide range of adjustment relative to the panel in substantially right angularly disposed directions in the same manner as is illustrated by the arrows D, D and E, E in Fig. 6 of the preceding form of the invention. The fastener element and the panel to which it is attached may be removed from the support by inserting a tool between the panel and the support.

It will be understood that in one of the important aspects of the invention the fastener element may be detachably mounted upon its supporting member in other ways than herein illustrated.

It has been found in production that fiber foundation sheets or boards have a tendency to warp, shrink or expand under different conditions. Thus, even though the fasteners are applied accurately at points which normally would register with the supporting surface openings, it has often been necessary to remove several fasteners and insert them at different locations in their foundation sheet in order to compensate for variations due to shrinkage, expansion or warping of the sheet. Such unnecessary operations have obviously caused delay in the assembly methods and in many instances, to avoid an unnecessary expenditure of time, entire panels have been discarded, thus materially increasing the cost of production by reason of such waste of materials. These difficulties have been overcome by the present invention by reason of the various permissible adjustments of the fastener elements relative to their foundation sheet and of the adjustment of said element and sheet relative to the supporting surface.

I claim:

1. Fastening means for releasably connecting two members together face to face, one member having an apertured portion, the other member having a removable device provided with two spaced spring prongs projecting in the same general direction and adapted to pass through said apertured portion and to be tensioned by the edges of the apertured portion when in holding position, said device including two spaced substantially parallel and coplanar base portions, and the supporting member for the device having slots the edges of which are underlapped by said base portions, the slots having offset portions spaced to permit entrance of the ends of the base portions when installing the device.

2. The combination with a supporting member having spaced generally L-shaped slots, of a fastener comprising base portions insertable through the slots to underlap one face of the supporting member along the edges of the slots, a bridge piece integrally joining the base portions and bridging the slots, and spring gripping means extended from the bridge piece at the opposite face of the supporting member.

3. The combination with a supporting member having spaced generally L-shaped slots, of a fastener comprising base portions insertable through the slots to underlap one face of the supporting member along the edges of the slots, a channel shaped bridge piece integrally joining the base portions and bridging the slots, said bridge piece having bent end portions extending through the slots, and spring gripping means extended from the bridge piece at the opposite face of the supporting member.

4. The combination with a supporting member having spaced substantially parallel longitudinal slots terminating in offset ends, of a fastener comprising base portions insertable through said offset ends to underlap one face of the supporting member along the edges of the slots, a bridge piece integrally joining the base portions and spanning the slots, and spring gripping means extended from the bridge piece at the opposite face of the supporting member.

5. The combination with a supporting member having spaced substantially parallel longitudinal slots terminating in offset ends, of a fastener comprising base portions insertable through said offset ends to underlap one face of the supporting member along the edges of the slots, a bridge piece integrally joining the base portions and spanning the slots, and spring gripping means extended from the bridge piece at the opposite face of the supporting member, said base portions being wider than said longitudinal slots.

JOHN H. ROETHEL.